United States Patent Office
3,391,061
Patented July 2, 1968

1

3,391,061
PROCESS FOR PRODUCING POLYSACCHARIDES
William H. McNeely, San Diego, Calif., assignor to Kelco Company, San Diego, Calif., a corporation of Delaware
No Drawing. Filed Jan. 27, 1966, Ser. No. 523,288
20 Claims. (Cl. 195—31)

This invention relates to a novel process for synthesizing certain polysaccharide polymers through the action of a bacteria of the genus Xanthomonas on carbohydrates. More particularly, the invention relates to a novel process in which the fermentation of carbohydrates by a bacteria of the genus Xanthomonas is carried out under controlled conditions which increase the growth rate of the bacteria and thereby produce the polysaccharide product through the use of a shorter final fermentation cycle.

In a biochemical fermentation process, the bacteria employed in the final fermentation reaction are generally grown in several stages prior to their introduction into the final fermentation medium. This procedure is employed in order to obtain a more vigorous growth of the bacteria in the final fermentaion medium.

A bacterial culture has a characteristic life cycle beginning with the time when the bacteria are placed in a nutrient medium and ending with the death of the culture after the nutrients in the medium have been exhausted. The bacterial life cycle is divided into four distinct phases. When the bacteria are first placed in their new environment, they undergo what is known as a lag phase. During this period, the number of bacteria remain at a low and fairly constant level for an extended period of time, such as 6 to 10 hours, even though the environment contains all of the nutrients and conditions which are required for growth. The lag phase of the life cycle can be explained as the period required for the bacteria to become adjusted to their new environment which, although friendly, is hostile in the sense that it is new and different.

Following the lag phase of the culture life cycle, the bacteria proceed into a period of very rapid growth which is termed the logarithmic growth phase. During this period, the number of bacteria increase at an exponential rate, which, when plotted on semi-log paper, is a straight line. When plotting such a curve, the bacterial count expressed in terms of total number of bacteria per unit volume is plotted along the ordinate axis which is drawn to logarithmic scale. Time is expressed along the horizontal axis which is drawn to regular scale.

After completing the logarithmic growth phase of its life cycle, the bacterial culture reaches a plateau where the bacterial count levels off and remains essentially constant. This phase of the life cycle, where equilibrium is maintained between the bacterial growth and death rates, is termed the stationary phase.

Following the stationary phase, the bacterial population of the culture enters into a rapid decline which is termed the logarithmic death phase. At this point, the nutrients in the bacterial environment are becoming exhausted and the bacteria are dying at a very rapid rate.

As stated previously, the bacteria employed in a biochemical fermentation process are customarily grown in several stages prior to their introduction into the final fermentation medium. This is done in order to maintain a more vigorous growth of the bacteria in the final fermentation medium. In the several stages of bacterial growth, the volume of the nutrient medium, and the size of the fermentation vessel are increased until the final fermentation is reached. During final fermentation, the volume of the fermentation vessel and the volume of nutrient medium become quite large in order to obtain a large volume of the desired product per unit time. In terms of equipment, labor and power costs, the time required for final fermentation is of critical importance since this phase of the process represents the largest expenditure of time and materials.

2

In practicing fermentation reactions according to the prior art, it was generally thought that the bacteria should be removed from the seed fermentor (the fermentation stage immediately preceding the final fermentation stage) when the bacteria were in or just at the end of the logarithmic growth phase of their life cycle. It was reasoned that the bacteria would then be most vigorous and would best adapt themselves to the new environment encountered in the final fermentation stage. This, thought prior art workers, would result in decreasing the lag phase of the bacterial life cycle during the final fermentation and thereby result in a shorter final fermentation cycle with an accompanying savings in equipment, labor and power costs.

A further reason for attempting to shorten the final fermentation cycle was to reduce the danger of contamination. The friendly environmental conditions employed in the final fermentation stage are ideal for the growth of many microorganisms. In a commercial fermentation process, it is difficult to maintain absolute sterility of the fermentation medium. As a result, there is considerable opportunity for the growth of contaminant bacteria, which may grow faster than the desired bacteria being employed in the process. When this occurs, the contaminant bacteria may become the dominant species in the fermentation medium. At worst, this can result in complete loss of the fermentation batch. Even when the batch is not lost, the contaminant bacteria may produce spores which survive the separation procedures and contaminate the desired product.

In a shortened final fermentation cycle, the problem of bacterial contamination is considerably lessened. A shorter fermentation cycle does not provide as much time for a bacterial contaminant to grow or produce spores and to complete with the desired bacteria for the available food supply in the nutrient medium.

An object of my invention is to provide a novel process for producing polysaccharides through the fermentation of carbohydrates with bacteria of the genus Xanthomonas.

A further object is to provide an improved process for preparing a Xanthomonas hydrophilic colloid through the fermentation of carbohydrates with a bacteria of the genus Xanthomonas, which process utilizes a shortened final fermentation cycle.

Additional objects will become apparent from the description and claims which follow.

In accord with my invention, I have discovered that the lag phase of the bacterial life cycle in the final fermentation stage is considerably reduced if the Xanthomonas bacteria employed as an inoculant for the final fermentation stage are removed from the seed fermentor immediately preceding the final fermentation stage when the bacterial culture is well into the stationary phase of its life cycle. The seed bacteria are preferably about 25 to about 75% of the way through the stationary phase of the culture life cycle and, more preferably, about 50 to about 60% of the way through the stationary phase. This discovery is quite surprising in view of the prior art teaching that the seed bacteria should be removed from the seed fermentor while the bacterial culture is in its logarithmic growth phase.

A convenient way to determine when the bacteria of the genus Xanthomonas are in the proper portion of the stationary phase for transfer to the final fermentor is to measure the viscosity of the medium in the seed fermentor. During the stationary phase of the life cycle of Xanthomonas bacteria, the bacteria produces a hydrophilic colloid which increases the viscosity of the fermentation medium. By measuring the viscosity of the medium, which is dependent upon the amount of colloid produced, one can determine the position of the bacterial culture in terms of its life cycle. Using this technique, quality control standards can be set in terms of a viscosity range to define the time of transfer of the bacteria from the seed fermentor to the final fermentor.

In the case of the *Xanthomonas campestris* species of bacteria, I have found that the viscosity of the seed inoculum taken from the seed fermentor should be at least 1000 cps. at 25° C. as measured by a Brookfield Model LVF Viscometer employing a No. 4 spindle rotating at 60 r.p.m.

As set forth in my co-pending applications, which are both entitled "Process for Producing Polysaccharides" and are filed on even date herewith, other important process conditions are preferably employed in my process in order to maximize the yield of Xanthomonas hydrophilic colloid. The content of each of these applications is incorporated herein by reference.

In practicing my invention, a fermentation medium is inoculated with a suitable organism of the genus Xanthomonas, as defined previously, and permitted to incubate at about room temperature under aerobic conditions for a period of about 48 hours. The fermentation medium generally contains a suitable carbohydrate at a concentration of about 1 to about 5% by weight. Suitable carbohydrates include, for example, dextrose, sucrose, maltose, fructose, lactose, and corn starch. As a suitable carbohydrate, crude sugars may be used such as deionized molasses or a product such as Hydrol-E-081, manufactured by Corn Products Refining Co. Hydrol-E-081 is a mixture composed largely of dextrose and maltose and includes small amounts of oligosaccharides. A further ingredient which is present in the fermentation medium is a source of magnesium ions. The magnesium ion content of the fermentation medium is in the range of about 0.0005 to about 0.0015% by weight. Suitable sources of magnesium ions include water-soluble magnesium salts such as magnesium sulfate heptahydrate, magnesium sulfate, magnesium acetate, magnesium chloride, magnesium nitrate, and magnesium acid phosphate.

The pH of the fermentation medium is quite important to suitable growth of the Xanthomonas bacteria. I have found that the colloid production of the Xanthomonas bacteria becomes inefficient below a pH of about 6.1. My preferred pH range is from about 6.5 to about 7.5. Control of the pH within this range can be obtained by the use of a buffer compound such as dipotassium acid phosphate at a concentration from about 0.4 to about 0.5 percent by weight of the fermentation medium. Conversely, the pH of the fermentation medium can be controlled through conventional means employing a pH meter coupled with a source of a suitable base such as a solution of potassium hydroxide. As the pH is lowered due to the production of acids in the fermentation reaction, small quantities of the potassium hydroxide solution may be automatically added by the pH controller to keep the pH within the desired range.

At least a trace quantity of phosphorus, generally in the form of a soluble phosphate salt, is also present in the fermentation medium. Larger quantities of phosphorus such as about 0.6 percent by weight, calculated as dipotassium acid phosphate, of the fermentation medium can, however, also be employed.

In order to obtain a rapid fermentation, I have discovered that it is essential to have the correct amount of oxygen available for the growing bacterial culture. If either too little or too much oxygen is available, the production of Xanthomonas hydrophilic colloid by the culture is slowed down. My process requires that the oxygen made available produce a sulfite oxidation value within the range of about 1.5 to about 3.5 millimoles of oxygen per liter per minute. Preferred sulfite oxidation values are from 2.0 to 3.0 millimoles of oxygen per liter per minute. A description of sulfite oxidation value is set forth in an article in Industrial Engineering Chemistry, Volume 36, page 504 (1936) by C. M. Cooper, G. A. Fernstrom, and S. A. Miller. The sulfite oxidation value is a measure of the rate of oxygen uptake in the fermentor under the agitation and aeration conditons employed.

A further ingredient which is present in the fermentation medium is a source of nitrogen. The nitrogen source may be organic in nature as, for example, an enzymatic digest of soybean meal such as Soy Peptone Type T, or Promosoy 100, a pancreatic hydrolysate of casein such as N–Z Amine Type AT, an enzymatic digest of proteins such as Ferm-Amine Type IV, or distillers' solubles such as Stimuflav. Promosoy 100 is sold by Central Soya Chemurgy Division; Stimuflav is marketed by Hiram Walker & Sons, Inc., and the other materials are sold by Sheffield Chemical, Norwich, New York. When utilizing only an organic nitrogen source in the fermentation medium, it is present in an amount ranging between about 0.1 and about 0.6 percent by weight of the fermentation medium. A preferred range is about 0.4 to about 0.5 percent by weight.

As shown in my co-pending application entitled "Process for Producing a Polysaccharide," filed of even date herewith, ammonium nitrate may be employed as an inorganic nitrogen source in the fermentation medium. The subject matter of my co-pending application is incorporated herein by reference. The amount of ammonium nitrate employed ranges from about 0.02 to about 0.15 and preferably from about 0.045 to about 0.09 percent by weight of the fermentation medium.

In practicing my invention, a flour or bran derived from cereal grains or legumes may be employed in the final fermentation medium and/or in the seed fermentor preceding final fermentation. The flour or bran may be employed at a concentration ranging from about 0.02 to 5% by weight of the fermentation medium. The concentration of the carbohydrate, as previously stated, ranges from about 1 to about 5 percent by weight. The flour or bran is used as though it were a replacement for the carbohydrate. Thus, the total concentration of carbohydrate plus the flour or bran ranges between about 1 and about 5 percent with the flour or bran replacing as little as 2% or as much as 100% of the carbohydrate. The flour or bran employed can be derived from either cereal grains or legumes. Appropriate flours or brans which may be employed are wheat flour, rye flour, oat flour, rice bran, barley flour, corn flour, and flours derived from soybeans and peas. This listing is merely illustrative and is not designed to include all of the many flours and brans derived from grain or legumes.

Preferably, the flour or bran which may be employed in my process is derived from cereal grain and most preferably, the flour or bran is derived from rice. Use of rice flour or rice bran has been found to give a greatly improved growth rate of Xanthomonas bacteria, and a significant increase in the production rate of Xanthomonas hydrophilic colloid.

Mixtures of a flour or bran with a carbohydrate may be employed in the final fermentation medium. Suitable mixtures employ flour or bran as a replacement for about 15 percent of the carbohydrate, i.e., the total concentration of carbohydrate and flour or bran ranges from about 1 to about 5 percent with about 15 percent of the total being flour or bran.

In some instances I may employ a final fermentation medium in which flour or bran has been substituted for all of the carbohydrate. Cereal grain flours or brans, e.g., rice flour, can be used to replace all of the carbohydrate in the final fermentation medium. Leguminous flours or brans, e.g., obtained from soybeans or peas, are not used as a replacement for more than 50% of the carbohydrate in the final fermentation medium since they do not contain a sufficient quantity of the materials required for efficient colloid production. When all or a very major portion of the carbohydrate in the final fermentation medium is replaced with a grain flour or bran, the viscosity of the colloid produced is lowered somewhat.

The growth of the Xanthomonas bacteria in the seed fermentor (the growth stage preceding transfer of the bacteria to the final fermentation medium) must be carefully controlled in order to obtain vigorous growth of the bacteria after they are transferred to the final fermentation medium. The conditions employed in the seed fermentor and final fermentor differ in a number of important respects. The most important difference concerns the concentration of the flour or bran which I may employ in the fermentation media. As set forth previously, the flour or bran may be employed in an amount which replaces from about 2 to 100% of the carbohydrate generally employed in the fermentation medium. The flour or bran may not be employed at all in the final fermentation medium and used only in the seed fermentor, or vice versa.

In practice, I prefer to replace all of the carbohydrate in the seed fermentor with a flour or bran, as described previously. This results in a concentration of flour or bran in the seed fermentation medium which ranges from about 1 to about 5% by weight and provides bacteria which grow vigorously in the final fermentation medium.

I prefer to employ no bran or flour in the final fermentation medium. This results in a decreased bacterial growth rate in the final fermentor which, however, is offset by the fact that the product obtained is purer and contains less insolubles.

A further difference between the conditions in the seed fermentor and in the final fermentor concerns the content of an organic nitrogen source which I may employ. The various organic nitrogen sources are as defined previously. In the seed fermentor, I generally employ an organic nitrogen source in an amount ranging from about 0.1 to about 0.5% by weight in conjunction with ammonium nitrate in the amounts specified previously. However, in the final fermentation medium, I employ either none or a lesser quantity of the organic nitrogen source in an amount up to about 0.1% by weight of the medium in conjunction with the ammonium nitrate in the amounts specified previously.

A further distinction between the seed fermentor and final fermentor concerns the condition of the flour or bran employed. The flour or bran may be partially hydrolyzed by an enzyme prior to its introduction into the fermentation medium. Partial hydrolysis of the flour or bran prior to its use is not essential, however, and this is especially true when the flour or bran is employed in the seed fermentor. Conversely, when the flour or bran is employed in the final fermentor, I prefer that it be partially hydrolyzed prior to use.

In other aspects, i.e., aeration rates, temperature, magnesium ion concentration, phosphorous concentration, etc., the process conditions employed in the final fermentor are the same as those employed in the seed fermentor.

To further illustrate my invention, there are presented the following examples in which all parts and percentages are by weight unless otherwise indicated:

EXAMPLE I

A fermentation medium was prepared in a seed fermentor by adding the following ingredients to the fermentor:

| | Lbs. |
|---|---|
| Rice flour | 186 |
| Dipotassium acid phosphate | 50 |
| Ammonium nitrate | 6 |
| Soy Peptone Type T (supplied by Sheffield Chemical Co.) | 15 |
| Magnesium sulphate heptahydrate | 0.62 |
| Water | 6000 |

The sterile seed medium was inoculated aseptically with 4.1 liters of *Xanthomonas campestris* inoculum. The inoculum had previously been prepared by inoculating 4.0 liters of sterile YM broth (Diffco) in a 12-liter flask with 100 milliliters of *Xanthomonas campestris* bacterial culture taken from a seed culture prepared by aerobic fermentation in a Diffco broth for 24 hours in a shake flask. The 4.1 liters of seed culture in the 12-liter flask had been grown for 40 hours in a shaking machine in a room maintained at 29° C. YM broth is sold by the Diffco Chemical Company and contains the following ingredients in the following proportions:

| | Gms. |
|---|---|
| Bacto yeast, extract | 3 |
| Malt extract, Diffco | 3 |
| Bacto-peptone | 5 |
| Bacto-dextrose | 10 |

The above quantities of ingredients are used to form a broth by adding water in an amount to form 1 liter of material. Such a broth was employed in incubating the *Xanthomonas campestris* bacterium employed as an inoculant.

The temperature of the seed fermentor, inoculated with *Xanthomonos campestris* bacteria in the manner described above, was maintained at 29° C. with vigorous agitation and aeration at a rate of 0.5 cubic feet of air per cubic foot of medium volume (measured at standard temperature and pressure). Samples of inoculum were removed from the seed fermentor at 17 hours and 24 hours. This inoculum sample sizes were 1135 milliliters and the samples were taken aseptically from the seed fermentor and used to inoculate 6 gallons of sterile media in 10-gallon fermentors. The viscosity of the inoculum sample taken at 17 hours was 10 cps. and the viscosity of the sample taken at 24 hours was 62 cps. (both measured with a Brookfield Model LVF Viscometer in the manner described above).

The 6 gallons of sterile fermentation media in the 10-gallon fermentors contained the following:

| Media for 10-gallon fermentors | Grams | Percent by weight |
|---|---|---|
| Dextrose (glucose; anhydrous basis) | 681 | 3.0 |
| Dipotassium acid phosphate | 113.5 | 0.5 |
| Amonium nitrate | 20.4 | 0.09 |
| Soy Peptone Type T (Sheffield Chemical Co.) | 11.35 | 0.05 |
| Magnesium sulfate·$7H_2O$ | 2.27 | 0.01 |
| Water | to 6 gallons | |

The temperature of the 10-gallon fermentors was maintained at 29° C. while the inoculated media were agitated vigorously and aerated at a rate of 0.5 cubic feet of air per cubic foot of media per minute (measured at standard temperature and pressure).

The viscosity of the fermented beer in each 10-gallon fermentor was checked at zero time after inoculation and later at 20 hours. The results are as follows:

| Viscosity of fermented beer in the final fermentation | Start, cps. | 20 hours, cps. |
|---|---|---|
| 17 hour seed (10 cps.) | 5 | 50 |
| 24 hour seed (62 cps.) | 5 | 110 |

The above test data clearly shows the superior results obtained in the final fermentation by inoculating with a seed bacteria which had fermented for 24 hours in the seed fermentor and obtained a viscosity of 62 cps. prior to transfer to the final fermentor.

In still further tests, it was observed that a *Xanthomonas campestris* seed inoculum which had been grown in the seed fermentor as described in Example I for approximately 30 hours and obtained a viscosity of about 1050 cps. gave greatly superior results when used as the inoculum for a final fermentation media as described in Example I. The 30-hour seed, when employed as the inoculum in a sample size of about 1135 milliliters for the 10-gallon fermentor described in Example I, resulted in greatly increasing the speed of bacterial growth in the final fermentation. Immediately after inoculation of the 6 gallons of the media in the 10-gallon fermentor, the viscosity of the final fermentation beer was about 8 cps. and after 20 hours the viscosity of the final fermentation beer had reached a viscosity of about 840 cps. This vast improvement in the viscosity of the final fermentation beer dramatically illustrates the great improvement achieved by my invention. The viscosity of the final fermentation beer is related to the production of hydrophilic colloid in the final fermentation since the viscosity of the beer increases as the colloid concentration of the beer is increased.

The Xanthomonas hydrophilic colloid prepared according to my process may be isolated from the final fermentation beer by precipitation therefrom with a lower alcohol such as isopropyl alcohol followed by drying and milling of the precipitated colloid. Further, the Xanthomonas hydrophilic colloid obtained according to my process may be obtained from the fermentation beer by passing the beer through a drum dryer, or by drying the final fermentation beer through use of equivalent drying methods such as spray drying, vacuum drying, freeze drying, and the like.

Although I have illustrated my invention primarily with regard to the employment of the *Xanthomonas campestris* species of bacteria, other bacterial species of the genus Xanthomonas may also be employed in my process. Illustrative species include *Xanthomonas phaseoli, Xanthomonas malvacearum, Xanthomonas carotae, Xanthomonas begoniae, Xanthomonas incanae,* and *Xanthomonas vesicatoria.* Of the various species of Xanthomonas bacteria, I prefer *Xanthomonas campestris* and *Xanthomonas malvacearum* since these species work particularly well in my process.

The Xanthomonas hydrophilic colloids produced by my process are, as stated previously, colloidal materials produced by bacteria of the genus *Xanthomonas.* Illustrative of such colloidal materials is the hydrophilic colloid produced by *Xanthomonas campestris* bacterium. This colloid is a high molecular weight, exocellular material in which the polymer contains mannose, glucose, potassium glucuronate and acetyl radicals. The potassium portion of the colloid can be replaced by several other cations without substantial change in the properties of the material.

The Xanthomonas hydrophilic colloid produced according to my process may be employed as an additive in drilling muds to reduce fluid loss and to suspend the solid materials contained in the mud. Moreover, the colloids may be employed as thickening agents in producing thickened water to be used in the secondary recovery of oil through water flooding.

As illustrated by the foregoing discussion, my invention is a broad one and results in greatly decreasing the time required in the final fermentation stage in the production of a Xanthomonas hydrophilic colloid through fermentation of carbohydrates with a bacterial species of the genus Xanthomonas. In illustrating my invention, I have made reference to specific times, temperatures, compositions, etc. However, I intend that my invention be limited only by the lawful scope of the appended claims and not by the foregoing description.

I claim:

1. A process for producing a Xanthomonas hydrophilic colloid, said process comprising inoculating a fermentation medium with an inoculum medium containing a bacterial organism of the genus Xanthomonas, said bacteria being about 25 to about 75% of the way through the stationary phase of the culture life cycle in the inoculum medium, said fermentation medium containing a carbohydrate in an amount ranging from about 1 to about 5% by weight, magnesium ions and phosphorus in at least trace amounts, a nitrogen source in minor amount, and water, aerating said fermentation medium under conditions sufficient to produce a sulfite oxidation value ranging from about 1.5 to about 3.5 millimoles of oxygen per liter per minute, maintaining the pH of the fermentation medium within the range from about 6.5 to about 7.5 and recovering the hydrophilic colloid produced by said Xanthomonas bacteria.

2. The process of claim 1 wherein said bacterial organism is about 50 to about 60% of the way through the stationary phase of the culture life cycle in the inoculum medium.

3. The process of claim 1 wherein said nitrogen source includes ammonium nitrate at a concentration ranging from about 0.02 to about 0.15% by weight of said fermentation medium.

4. The process of claim 1 wherein said bacterial organism is a *Xanthomonas campestris* bacteria.

5. The process of claim 4 wherein said inoculum medium has a viscosity of at least 1000 centipoises.

6. The process of claim 1 wherein said fermentation medium contains a material selected from the group consisting of flour and bran, the total content of said carbohydrate and said flour and bran ranging from about 1 to about 5% by weight with said flour and bran constituting from about 2% to 100% of the total.

7. The process of claim 6 wherein said flour and bran is obtained from grain.

8. The process of claim 6 wherein said flour and bran is obtained from legumes.

9. The process of claim 7 wherein said flour and bran is obtained from rice.

10. The process of claim 8 wherein said flour and bran is obtained from soybeans.

11. A process for producing a seed inoculum of a Xanthomonas bacteria, said process comprising incubating a seed fermentation medium including an organism of the genus Xanthomonas, said medium containing a carbohydrate in an amount ranging from about 1 to about 5% by weight, magnesium ions and phosphorus in at least trace amounts, an organic nitrogen source in minor amount, and water, aerating said fermentation medium under conditions sufficient to produce a sulfite oxidation value ranging from about 1.5 to about 3.5 millimoles of oxygen per liter per minute, maintaining the pH of said fermentation medium within the range from about 6.5 to about 7.5, and removing said Xanthomonas bacterial inoculum when the bacteria are from about 25 to about 75% of the way through the stationary phase of the culture life cycle in said seed fermentation medium.

12. The process of claim 11 wherein said Xanthomonas seed bacterial inoculum is removed when said bacteria is from about 50 to about 60% of the way through the stationary phase of the culture life cycle in said seed fermentation medium.

13. The process of claim 11 wherein said nitrogen source comprises an organic nitrogen source in an amount ranging from about 0.1 to about 0.5% by weight and ammonium nitrate in an amount ranging from about 0.02 to about 0.15% by weight.

14. The process of claim 11 wherein said seed fermentation medium includes an ingredient selected from the group consisting of flour and bran, the total content of said carbohydrate and said flour and bran ranging from about 1 to about 5% by weight with said flour and bran constituting from about 2% to 100% of the total.

15. The process of claim 14 wherein said flour and bran is derived from grain.

16. The process of claim 15 wherein said flour and bran is derived from rice.

17. The process of claim 14 wherein said flour and bran replaces all of said carbohydrate.

18. The process of claim 14 wherein said bacterial organism is a *Xanthomonas campestris bacteria.*

19. The process of claim 18 wherein said bacterial inoculum is removed when the seed fermentation medium has a viscosity of at least 1000 centipoises.

20. A fermentation process for producing a Xanthomonas hydrophilic colloid, said process comprising incubating a final fermentation medium including an inoculum of a bacterial organism of the genus Xanthomonas prepared according to the process of claim 11, said fermentation medium containing a carbohydrate in an amount ranging from about 1 to about 5% by weight, magnesium ions and phosphorus in at least trace amounts, and water, aerating said fermentation medium under conditions sufficient to produce a sulfite oxidation value ranging from about 1.5 to about 3.5 millimoles of oxygen per liter per minute, maintaining the pH of the fermentation medium within the range from about 6.5 to about 7.5 and recovering the hydrophilic colloid produced by said Xanthomonas bacteria.

No references cited.

ALVIN E. TANENHOLTZ, *Primary Examiner.*